United States Patent [19]

Yoshida

[11] Patent Number: 4,726,337

[45] Date of Patent: Feb. 23, 1988

[54] INTAKE SYSTEM FOR MULTIPLE INTAKE VALVE TYPE ENGINES

[75] Inventor: Takumori Yoshida, Iwata, Japan

[73] Assignee: Yamaha Hatsudoki Kabushiki Kaisha, Iwata, Japan

[21] Appl. No.: 24,890

[22] Filed: Mar. 10, 1987

Related U.S. Application Data

[63] Continuation of Ser. No. 586,886, Mar. 9, 1984, abandoned, which is a continuation of Ser. No. 333,940, Dec. 23, 1981, abandoned.

[30] Foreign Application Priority Data

Dec. 27, 1980 [JP] Japan ................................ 55-187716

[51] Int. Cl.⁴ .............................................. F02B 31/00
[52] U.S. Cl. ..................................... 123/308; 123/432; 123/52 M; 123/445
[58] Field of Search ................... 123/432, 308, 52 M, 123/52 MB, 445

[56] References Cited

U.S. PATENT DOCUMENTS

| | | | |
|---|---|---|---|
| 3,024,774 | 3/1962 | Eby | 123/52 M |
| 3,145,699 | 8/1964 | High | 123/445 |
| 4,246,874 | 1/1981 | Nakagawa et al. | 123/308 |
| 4,274,368 | 6/1981 | Shaffer | 123/52 MB |
| 4,276,862 | 7/1981 | Matsumoto | 123/432 |
| 4,317,438 | 3/1982 | Yagi et al. | 123/432 |
| 4,323,041 | 4/1982 | Endo et al. | 123/308 |
| 4,354,463 | 10/1982 | Otani et al. | 123/308 |

FOREIGN PATENT DOCUMENTS 160156 12/1980 Japan ................................ 123/445

*Primary Examiner*—E. Rollins Cross
*Attorney, Agent, or Firm*—Ernest A. Beutler

[57] ABSTRACT

Several embodiments of induction systems for internal combustion engines that improve maximum power and also provide good running at low and medium speeds with a good torque curve throughout the engine speed range. Each embodiment includes a pair of intake passages that serve each chamber of the engine through a respective pair of intake valves. The intake passages are each tuned to serve a different running condition of the engine.

20 Claims, 4 Drawing Figures

INTAKE SYSTEM FOR MULTIPLE INTAKE VALVE TYPE ENGINES

This is a continuation of U.S. patent application Ser. No. 586,886, filed Mar. 9, 1984, now abandoned, which is a continuation of Ser. No. 333,940, filed Dec. 23, 1981, now abandoned.

BACKGROUND OF THE INVENTION

This invention relates to an intake system for multiple intake valve type engines, and more particularly to an induction system for an engine that improves performance throughout the entire speed and load range.

The techniques of tuning an induction system for an engine are generally well known. It is also well known that induction system tuning may optimize running at a certain speed and load range; however, performance outside of this speed running condition may be deteriorated. For example, if the length of the runners of the induction system are tuned to achieve maximum power output, performance at low and mid-range may suffer.

It is, therefore, a principal object of this invention to provide an induction system for an internal combustion engine that offers good performance over a wide speed and load range.

It is known that the maximum power output of an engine may be increased by providing pairs of intake valves for each chamber of the engine, each of which is served by a separate intake passage. Although such arrangements improve maximum power output, this may be accompanied by a sacrifice in low and medium speed performance, particularly with a reduction of torque under these other running conditions. To offset these disadvantages, it has been proposed to incorporate a control valve in one of the induction passages that is operated so that the low speed requirements of the engine are supplied primarily through a single one of the induction passages.

It is a further object of this invention to provide an improved induction system of this type wherein the individual intake passages are tuned so as to improve performance throughout the engine speed and load range.

In engine embodying pairs of intake passages serving each chamber and a fuel injection system, it is important to insure that the amount of fuel delivered by the injection system is responsive to the total charge delivered to each chamber. This is particularly important where a control valve is employed as aforedescribed so that the charge at one speed range is delivered primarily through only one of the intake passages, and the charge at maximum output is delivered through both intake passages.

It is, therefore, a still further feature of this invention to provide an improved fuel feed control for an injection type engine having multiple intake passages.

In conjunction with the provision of a plurality of intake passages for each chamber of the engine and the independent tuning of these passages, it is important that this be achieved with as uncomplicated a construction as possible. It is, therefore, a still further object of this invention to provide an improved intake device for an engine embodying multiple intake passages.

SUMMARY OF THE INVENTION

A first feature of this invention is adapted to be embodied in an induction system for an internal combustion engine of the type that has a pair of intake ports serving the same chamber of the engine and separate intake passages each independently serving a respective one of the intake ports. In conjunction with this feature of the invention, the intake passages are each tuned differently from the other.

Another feature of this invention is adapted to be embodied in an induction system of the type having a pair of intake ports serving the same chamber of the engine, a pair of intake valves for controlling the flow through the intake ports, separate intake passages each independently serving a responsive one of the intake ports, and fuel injection nozzle means disposed to discharge at a point where the flow therefrom may flow through either of the intake passages. In accordance with this invention air flow detection means for controlling the fuel discharge of the fuel injection nozzle means is positioned to sense the total air flow through both of the intake passages.

Yet another feature of the invention is adapted to be embodied in an intake device for the induction system of an internal combustion engine. The intake device comprises a housing having an air inlet, a first plurality of individual air outlets each communicating with a first area within the housing that is in communication with the air inlet, and a second plurality of individual air outlets each communicating with a second area within the housing which second area is also in communication with the air inlet. The first area is spaced from the second area for establishing different flow conditions through the first air outlets than through the second air outlets.

DETAILED DESCRIPTION OF THE PREFERRED EMBODIMENTS

Figure 1:
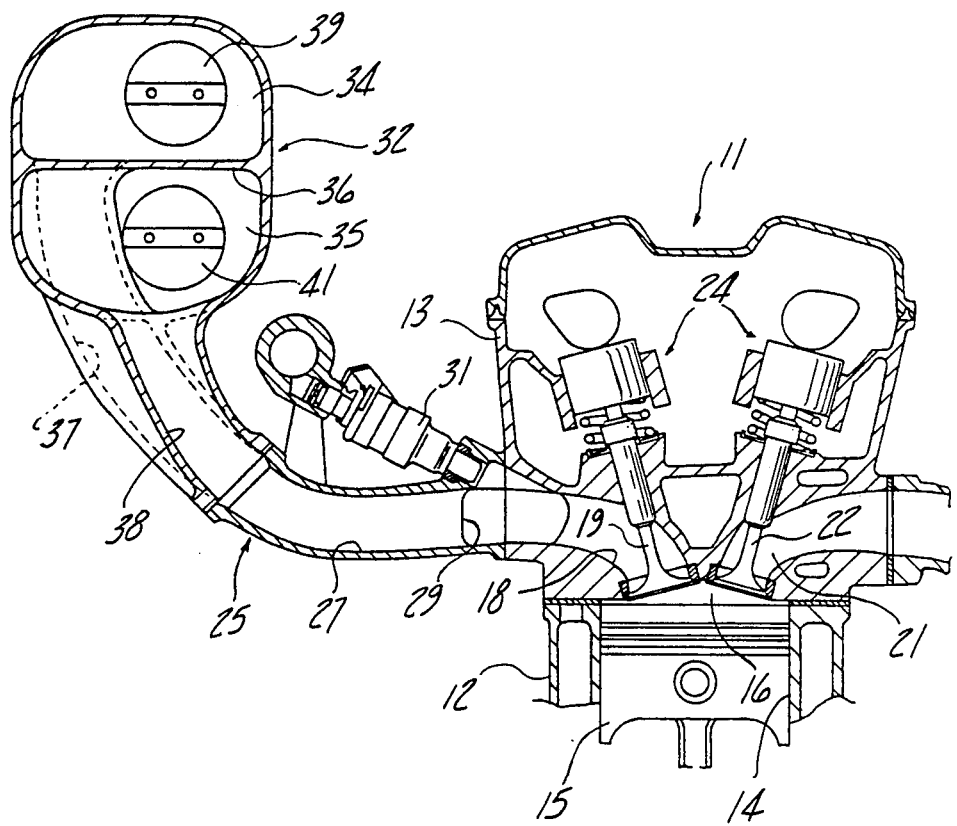
FIG. 1 is a cross sectional view taken through a portion of a cylinder of a multiple cylinder internal combustion engine constructed in accordance with a first embodiment of the invention.
Figure 2:
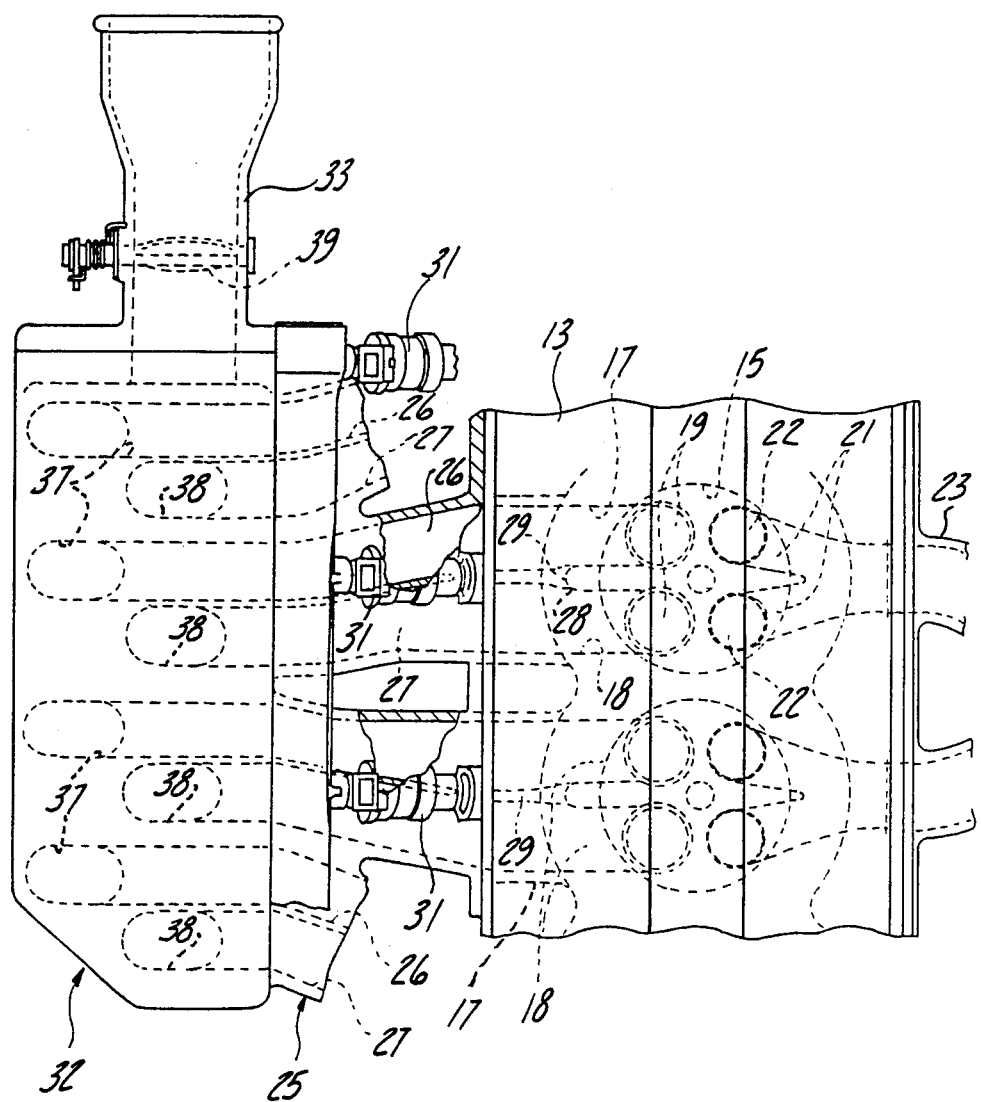
FIG. 2 is a partial top plan view, with portions broken away, of the embodiment of FIG. 1.

Embodiment of FIGS. 1 and 2

A multiple cylinder internal combustion engine constructed in accordance with a first embodiment of this invention is identified generally by the reference numeral 11. Although the invention is described in conjunction with a multiple cylinder engine, it is to be understood that certain facets may be employed in conjunction with single cylinder engines or engines of other than the reciprocating type.

The engine 11 includes a cylinder block 12 to which a cylinder head 13 is affixed in known manner. The cylinder block 12 is formed by cylinder bores 14 in which pistons 15 are supported for reciprocation. The pistons 15 drive a crankshaft (not shown) in a known manner. The cylinder head 13 is provided with a plurality of cavities 16 that cooperate with the pistons 15 and cylinder bores 14 to form the combustion chambers. The numeral 16 will at times be referred to as identifying the combustion chamber.

The cylinder head 13 is provided with a first intake passage 17 and a second intake passage 18 for each combustion chamber 16. The first and second cylinder head intake passages 17 and 18 terminate in ports that communicate with the respective combustion chamber 16. Intake valves 19 control the flow through these ports into the respective combustion chamber 16.

Pairs of exhaust passages 21 extend through the opposite side of the cylinder head 13. Exhaust valves 22 control the flow from each combustion chamber 16 into the respective exhaust passages 21. The exhaust passages 21 merge and discharge into an exhaust manifold 23.

Any suitable mechanism is employed for operating the intake valves 19 and exhaust valves 22. The valve operating mechanism may take the form of a pair of overhead mounted cam shafts, as indicated generally by the reference numeral 24.

An intake manifold, indicated generally by the reference numeral 25, is affixed to the intake side of the cylinder head 13 in a known manner. The intake manifold 25 is provided with pairs of first and second intake passages 26, 27 for each combustion chamber 16. The first manifold passages 26 supply the first cylinder head passages 17 while the second manifold passages 27 serve the second cylinder head intake passages 18.

The cylinder head passages 17 and 18 are divided by a wall 28 which terminates at an opening 29 that is spaced closely adjacent the intake ports and intake valves 19. The passage 29 interconnects the cylinder head intake passages 17 and 18 for a reason to be described and extends into the manifold 25. Preferably the effective cross-sectional area of the passage 29 is at least equal to the effective cross-sectional area of the cylinder head intake passage 17.

A plurality of fuel injection nozzles are positioned with each nozzle 31 being supported by the manifold 25 in a location so that its discharge spray flows into the interconnecting passage 29 and at least a portion of it will impinge upon the wall 28. As will be described, this disposition of the nozzles 31 insures that fuel will be delivered to the chamber 16 in uniform quantities through the engine and load ranges.

An air intake device, indicated generally by the reference numeral 32, is provided for delivering an air charge to the manifold 25. The intake device 32 comprises an elongated housing having an air inlet 33 formed at one of its ends. The inlet 33 is in communication with an air flow detector (not shown) of any known type and which is adapted to sense the total air flow into the intake device 32. The interior of the intake device 32 is divided into an upper chamber 34 and a lower chamber 35 by means of a generally horizontally extending wall 36. The wall 36 extends at least in part through the inlet 33 so as to divide it also into an upper portion and a lower portion.

A plurality of first runners 37 are formed by the intake device 32. The first runners 37 each extend from the lower end of the chamber 34 to a first manifold passage 26. Thus, a first series of intake conduits are formed for each combustion chamber 16 extending from the intake device chamber 34 and consisting of runners 37, manifold passages 26 and cylinder head passages 17.

A second series of runners 38 are formed in the intake device 32. The second runners 38 extend from the lower surface of the lower chamber 35 to the manifold passages 27 and cylinder head passagess 18 so as to form individual intake tracts for the combustion chamber 16 that have a different length than the tract which extends from the housing chamber 34 to the combustion chamber 16. The reason for this will be as described subsequently.

A main, manually operated throttle valve 39 is positioned in the portion of the inlet 33 above the wall 36 and which cooperates with the runners 37. The valve 33 is adapted to be operated by a suitable linkage system (not shown) under control of the operator. An automatically controlled valve 41 is positioned in the portion of the inlet 33 below the wall 36 for controlling the flow to the intake device cavity 35. The valve 41 is operated so that it does not begin to open until the main throttle valve 39 has a predetermined degree of opening. The point of opening of the secondary throttle valve 41 is chosen so that it will occur at a point when the engine 11 is operating above a predetermined engine speed and engine load. Normally this point will be above or near the upper end of the mid range speed and load of the engine.

In operation, when the engine is running at idle or at low speeds, the control valve 41 will be closed and only the manually operated throttle valve 39 will be opened. Thus, the air charge for the engine will be supplied from the chamber 34 through the runners 37, manifold passage 26 and cylinder head passages 17. The length of these individual inlet tracts is tuned so as to achieve maximum torque at this speed range. Because the charge is delivered to the chamber 16 primarily only through one of the intake tracts, even though both of the intake valves 19 are opened, the charge will enter the chambers 16 at a relatively high velocity and good running characteristics will be achieved.

As the manually operating throttle valve 39 is progressively opened, a point will occur wherein the constriction of the intake valve 19 in the passages 17 will not permit sufficient charge to enter the chamber so as to achieve maximum torque. When this condition occurs, a portion of the charge will enter the chambers through the passage 29 and second cylinder head intake passage 18. The provision of the interconnecting passageway 29 permits the charge to be delivered through both intake valves 19 during this running condition and torque and mid range performance are significantly improved through the use of the passage 29. Because of the disposition of the injection nozzles 31 so that they discharge onto the wall 28, there will be good fuel distribution to the chamber 16 regardless of whether the intake charge is delivered only through the passages 17 or through both passages 17 and 18.

As the load and speed of the engine continues to increase due to continued opening of the throttle valve 39, the control valves 41 will be progressively opened. Thus, a portion of the intake charge will be delivered through the runners 38, manifold passages 27 and cylinder head intake passages 18. The length of this inlet tract is tuned so as to provide good charging efficiency at maximum engine speeds. Thus, the described arrangement promotes good charging efficiency throughout the engine speed and load ranges and, furthermore, provides a good torque curve, maximum power output, while at the same time maintaining good efficiency. By tuning the separate intake tracts serving each chamber, these results may be achieved and good charging efficiency insured at all engine speeds. Furthermore, since the separate intake tracts are generally independent of each other, the pulsations set up in each tract will not interfere with those of the other.

Figure 3:
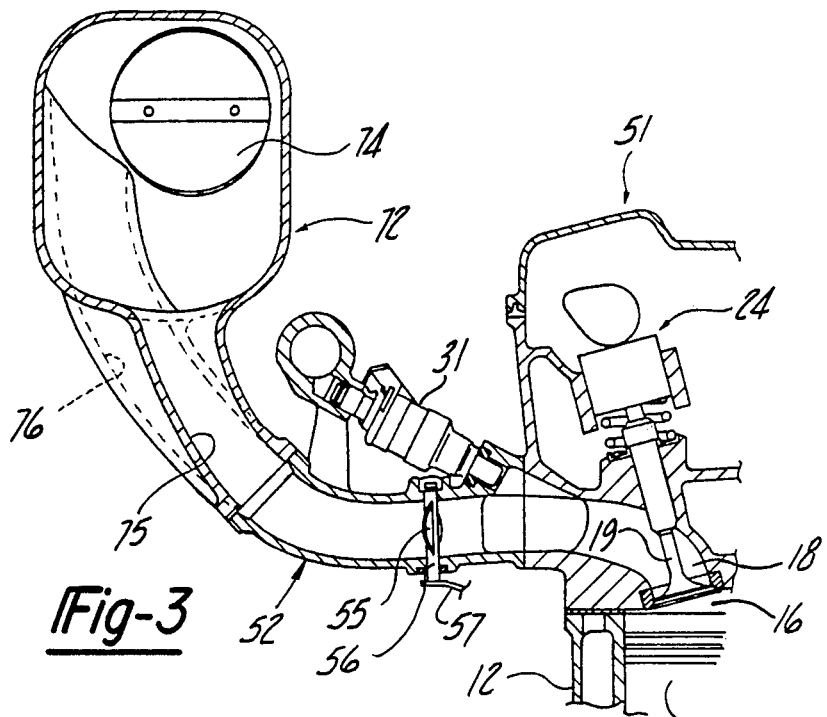
FIG. 3 is a cross sectional view, in part similar to FIG. 1, showing another embodiment of the invention.
Figure 4:
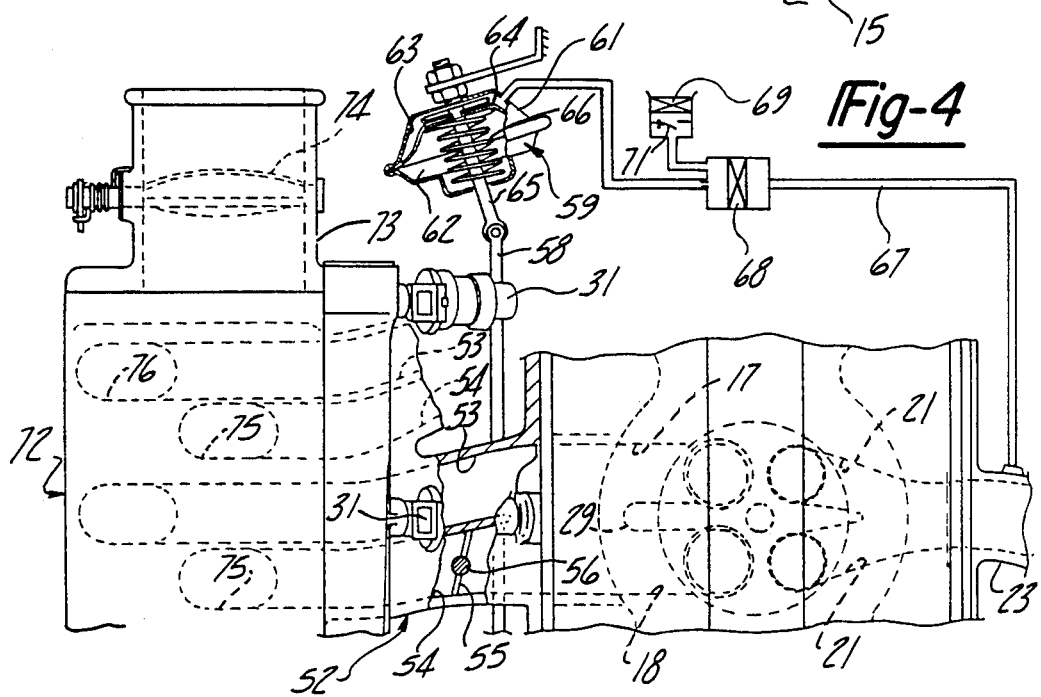
FIG. 4 is a top plan view, with portions broken away and other portions shown schematically, of the embodiment shown in FIG. 3.

Embodiment of FIGS. 3 and 4

An engine constructed in accordance with a second embodiment of the invention is identified generally by the reference numeral 51. The valving and construction of the engine 51, except for the intake manifold and air intake device, are the same as the previously described embodiment. For this reason, the components which are the same have been identified by the same reference numerals and their description will not be repeated.

In this embodiment, an intake manifold, indicated generally by the reference numeral 52, is provided. The intake manifold 52, as in the previously described embodiment, has first intake passages 53 that cooperate with the individual cylinder head intake passages 17 and second passages 54 that cooperate with the cylinder head intake passages 18. In this embodiment the control of the air flow through the second manifold passages 54 and the corresponding cylinder head second intake passages 18 is provided by individual control valves 55 which are positioned in the manifold 52 in each of the passages 54. Each control valve 55 is supported for rotation on a control valve shaft 56 which has an actuating arm 57 affixed thereto. The actuating arms 57 of all of the control valves 55 are pivotally connected to a common actuating link 58 so that they will be operated in unison.

The control valves 55 are operated in response to the engine speed and load and for this purpose an actuator, indicated generally by the reference numeral 59, is provided. The actuator 59 may be responsive to engine load as sensed either by a pressure or pressures in the intake system, by any of the well known devices used for this purpose, or may be responsive to the pressure in the exhaust system as in the illustrated embodiment. The actuator 59 includes an outer housing 61 that is divided into an atmospheric pressure chamber 62 and a sensing chamber 63 by means of a diaphragm 64. The diaphragm 64 is connected to an actuating rod 65 which is, in turn, pivotally connected to the actuating link 58. A coil compression spring 66 is positioned in the chamber 62 and normally urges the diaphragm 64 and rod 65 to a position wherein the control valves 55 are either fully or substantially fully closed.

The chamber 62 is continuously vented to atmospheric pressure by means of a clearance that exists between the housing 61 and the rod 65. The chamber 63 is exposed to exhaust gas pressure by means of a conduit indicated schematically at 67 that extends to one of the exhaust passages of the exhaust manifold 23. A filter 68 is interposed in the conduit 67 so as to preclude the admission of foreign particles into the actuator 59.

In order to periodically clean the filter 68, an atmospheric inlet 69 is interposed between the filter 68 and the actuator chamber 63. The atmospheric inlet 69 incorporates its own filter and a check valve 71 which is normally closed when there is a greater than atmospheric pressure in the conduit 67. At such times as a less than atmospheric pressure is experienced in the manifold 23, as occurs due to the pulsations of the engine, a reverse flow will be induced through the filter 68 by opening of the check valve 71 and any particles accumulated by the filter 68 will be driven back into the exhaust system.

The induction system also includes an intake device, indicated generally by the reference numeral 72. The intake device 72 includes an inlet portion 73 in which a single, manually operated throttle valve 74 is provided. Unlike the embodiment of FIGS. 1 and 2, the interior of the intake device 72 is not divided by means of a wall. Nevertheless, separate tuning is still accomplished by virtue of short runners 75 that extend from the lower wall of the intake device 72 and which connect with the second manifold passages 54 and, accordingly, the cylinder head intake passages 18. As in the previous embodiment, the short runners 75 are tuned with the remainder of their cooperating intake passages for maximum performance at full power.

Longer runners 76 are also provided by the intake device 72 and they terminate adjacent the upper end of the intake device 72. These longer runners 76 cooperate with the manifold passages 53 and cylinder head intake passages 17 and as in the previously described embodiment, are tuned for low and mid range running.

The operation of this embodiment is similar to the operation of the previously described embodiment except that the control valves 55 are operated in response to exhaust pressure rather than the position of the throttle valve 74. That is, at low engine speeds the control valves 55 will be maintained in a closed position by the atmospheric pressure acting in the secondary chamber 62 and the action of the spring 66. Thus the charge requirements will be primarily supplied through the runners 76, manifold passages 53 and cylinder head intake passages 17. As the speed and load of the engine increase due to opening of the throttle valve 74, a point will be reached when a portion of the intake charge passes through the passage 29 and enters the chamber through the intake passages 18 in addition to the intake passages 17. Eventually the speed and load will be such that the pressure in the conduit 67 and chamber 63 will overcome the atmospheric pressure and the pressure of the spring 66 to open the control valves 55. Then, maximum power may be achieved. Also, as with the previously described embodiment, the individual intake tracts are designed to maximize performance throughout the entire speed and load ranges without interference from each other.

It should be readily apparent from the foregoing description that each embodiment is effective to provide extremely good running throughout the entire speed and load range of the engine and also permits maximum power to be achieved. By employing relatively independent intake tracts, the induction system may be tuned to a wide range of running conditions and a good power and torque curve can be obtained. Although two embodiments of the invention have been illustrated and described, various other changes and modfications may be made without departing from the spirit and scope of the invention, as defined by the appended claims.

I claim:

1. In an induction system for a chamber of an internal combustion engine of the type having a pair of substantially equal area intake ports serving said chamber and separate intake passages each independently serving a respective one of said intake ports, the improvement comprising each of said intake passages having its effective length and effectional cross sectional area tuned to improve induction efficiency for a different running condition of the engine than the other, the tuning of each of said intake passages being accomplished by means that creates a condition in said chamber that will not adversely effect the induction into said chamber from the other intake passage.

2. An induction system for a chamber of an internal combustion engine of the type having a pair of intake ports serving said chamber and separate intake passages each independently serving a respective one of said intake ports, the improvement comprising each of said intake passages being tuned to improve induction efficiency for a different running condition from the other, said tuning of said intake passages being achieved by providing different effective lengths therefor, the tuning of each of said intake passages being accomplished by means that creates a condition in said chamber that will not adversely effect the induction into said chamber from the other intake passage.

3. An induction system as set forth in either claim 1 further including throttle valve means in said intake passages for controlling the flow therethrough so that the idle charge is delivered to the chamber through a first of the intake passages and the wide open load charge requirements are supplied through both of said intake passages.

4. An induction system as set forth in claim 3 wherein the throttle valve means comprise a first throttle valve that is manually actuated and a second throttle valve that is automatically actuated.

5. An induction system as set forth in claim 4 wherein the automatically actuated throttle valve is opened in response to the speed and load of the engine.

6. An induction system as set forth in claim 5 wherein the automatically operated throttle valve is opened in response to the pressure in the exhaust system of the engine.

7. An induction system as set forth in claim 6 wherein a conduit extends from the exhaust system of the engine to an actuator for the automatically operated throttle valve, there being a filter interposed in said conduit and pressure responsive check valve means in said conduit between said filter and said actuator for inducing a reverse flow through said filter when the pressure in the exhaust system is less than atmospheric for inducing a back flow through said filter.

8. An induction system as set forth in claim 4 wherein the intake passages are separated by a common wall, there being an opening in said wall for permitting flow between said passages.

9. An induction system as set forth in claim 8 further including a fuel injection nozzle means for delivering a fuel discharge for the chambers of the engine.

10. An induction system as set forth in claim 9 wherein the fuel injection nozzle means comprise a single fuel injection nozzle for the chamber, said fuel injection nozzle being disposed to discharge into the wall opening and against a portion of the wall defining the opening.

11. An induction system as set forth in claim 9 further including an air flow detector for controlling the amount of fuel discharged by the fuel injection nozzle means, the intake passages having a common inlet in which the air flow detector is positioned.

12. An induction system as set forth in claim 11 wherein the throttle valve means is positioned downstream of the air flow dectector.

13. An induction system as set forth in claim 12 wherein the fuel injection means comprise a single fuel injection nozzle for the chamber, said fuel injection nozzle being disposed to discharge into the wall opening and against a portion of the wall defining the opening.

14. An induction system as set forth in claim 1 wherein the intake passages have a common air inlet.

15. An induction system as set forth in claim 14 wherein the common air inlet is formed by an air inlet device, the intake passages being tuned by having their openings into the air inlet device disposed at different locations therein.

16. An induction system as set forth in claim 15 wherein the air inlet device is separated into two chambers by a wall, one of the intake passages having its inlet in one of the chambers and the other of the intake passages having its inlet in the other of the chambers.

17. An induction system as set forth in claim 15 further including throttle valve means in the inlet of the intake device.

18. An induction system as set forth in claim 16 further including first throttle valve means for controlling the flow into the first of the chambers and second throttle valve means for controlling the flow into the second of the chambers.

19. An induction system as set forth in claim 2 further including throttle valve means in said intake passages for controlling the flow therethrough so that the idle charge is delivered to the chamber through a first of the intake passages and the wide open load charge requirements are supplied through both of said intake passages.

20. An inducation system as set forth in claim 16 further including throttle valve means in the inlet of the intake device.

* * * * *

UNITED STATES PATENT AND TRADEMARK OFFICE
CERTIFICATE OF CORRECTION

PATENT NO. : 4,726,337

DATED : February 23, 1988

INVENTOR(S) : Takumori Yoshida

It is certified that error appears in the above-identified patent and that said Letters Patent is hereby corrected as shown below:

Abstract, line 5, "includes" should be --including--.

Column 3, line 43, after "engine" insert --speed--.

Column 3, line 68, "passagess" should be --passages--.

Column 6, line 64, Claim 1, "effectional" should be --effective--.

Column 7, line 16, Claim 3, delete "either".

Column 8, line 14, Claim 12, "dectector" should be --detector--.

Column 8, line 47, Claim 20, "inducation" should be --induction--.

Signed and Sealed this

Fifth Day of May, 1992

*Attest:*

DOUGLAS B. COMER

*Attesting Officer*     *Acting Commissioner of Patents and Trademarks*